United States Patent
Skinner et al.

(10) Patent No.: US 9,780,642 B2
(45) Date of Patent: Oct. 3, 2017

(54) ENERGY RECOVERY SNUBBER (71) Applicant: TDK-Lambda UK Limited, Devon (GB)

(72) Inventors: Andrew John Skinner, Devon (GB); Atul Abhyankar, Mumbai (IN)

(73) Assignee: TDK-Lambda UK Limited, Devon (GB)

( * ) Notice: Subject to any disclaimer, the term of this patent is extended or adjusted under 35 U.S.C. 154(b) by 150 days.

(21) Appl. No.: 14/617,329

(22) Filed: Feb. 9, 2015

(65) Prior Publication Data
US 2015/0244254 A1 Aug. 27, 2015

(30) Foreign Application Priority Data

Feb. 24, 2014 (GB) .................. 1403202.3

(51) Int. Cl.
*G05F 1/00* (2006.01)
*H02M 1/34* (2007.01)
*H02M 3/155* (2006.01)
*H02M 3/335* (2006.01)

(52) U.S. Cl.
CPC ............ *H02M 1/34* (2013.01); *H02M 3/155* (2013.01); *H02M 3/33507* (2013.01); *H02M 2001/342* (2013.01); *H02M 2001/346* (2013.01); *H02M 2001/348* (2013.01); *Y02B 70/1433* (2013.01); *Y02B 70/1491* (2013.01)

(58) Field of Classification Search
CPC ....... H02M 3/33507; H02M 2001/342; H02M 2001/346; H02M 3/155; H02M 2001/348; H02M 1/34

USPC ......................................... 323/222
See application file for complete search history.

(56) References Cited

U.S. PATENT DOCUMENTS

| | | | |
|---|---|---|---|
| 4,130,862 A | 12/1978 | Holt | |
| 5,694,303 A | 12/1997 | Silberkleit et al. | |
| 6,314,002 B1 | 11/2001 | Qian et al. | |
| 6,421,255 B1 | 7/2002 | Frebel et al. | |
| 6,473,318 B1 | 10/2002 | Qian et al. | |
| 6,798,670 B2 | 9/2004 | King | |
| 7,061,778 B2 | 6/2006 | Odell et al. | |
| 7,403,402 B2 | 7/2008 | Odell et al. | |

(Continued)

FOREIGN PATENT DOCUMENTS

| | | |
|---|---|---|
| EP | 0977346 A1 | 2/2000 |
| EP | 1605576 A1 | 12/2005 |

(Continued)

*Primary Examiner* — Adolf Berhane
*Assistant Examiner* — Afework Demisse
(74) *Attorney, Agent, or Firm* — The Webb Law Firm (57) ABSTRACT

An energy recovery snubber circuit for a power converter which includes a flyback transformer driven by a converter switch is disclosed. The snubber circuit includes two capacitors which are connected such that, when the snubber circuit is connected to a primary winding of the flyback transformer, the capacitors are charged in series by current flowing in a first direction in the primary winding when the converted switch is turned OFF, to recover energy stored in the leakage inductance of the transformer, and discharged in parallel to cause current flow in a second direction in the primary winding of the transformer, to thereby transfer the recovered energy to the transformer.

19 Claims, 5 Drawing Sheets

(56) References Cited

U.S. PATENT DOCUMENTS

| | | | |
|---|---|---|---|
| 8,000,112 B2* | 8/2011 | Zhang | H02M 1/34 363/21.01 |
| 8,009,448 B2 | 8/2011 | Liu | |
| 8,498,134 B2 | 7/2013 | Pollak et al. | |
| 2004/0085050 A1 | 5/2004 | Jinno | |
| 2008/0309305 A1 | 12/2008 | Atmur | |
| 2009/0196075 A1 | 8/2009 | Arduini | |
| 2009/0225574 A1 | 9/2009 | Fornage | |
| 2011/0057639 A1* | 3/2011 | Chung | H02M 1/34 323/311 |
| 2011/0058395 A1* | 3/2011 | Fujiyoshi | H02M 3/3372 363/21.04 |
| 2012/0170328 A1 | 7/2012 | Beasley | |
| 2013/0343098 A1 | 12/2013 | Kern et al. | |
| 2014/0204620 A1 | 7/2014 | Skinner | |

FOREIGN PATENT DOCUMENTS

| | | |
|---|---|---|
| GB | 2509982 A | 7/2014 |
| JP | 823676 A | 1/1996 |
| WO | 2014120153 A1 | 8/2014 |

* cited by examiner

ENERGY RECOVERY SNUBBER

CROSS-REFERENCE TO RELATED APPLICATION

This application claims priority to United Kingdom Patent Application No. 1403202.3 filed Feb. 24, 2014, the disclosure of which is hereby incorporated in its entirety by reference.

BACKGROUND OF THE INVENTION

Field of the Invention

The present invention relates to an energy recovery snubber for a power converter.

Description of Related Art

Figure 1:
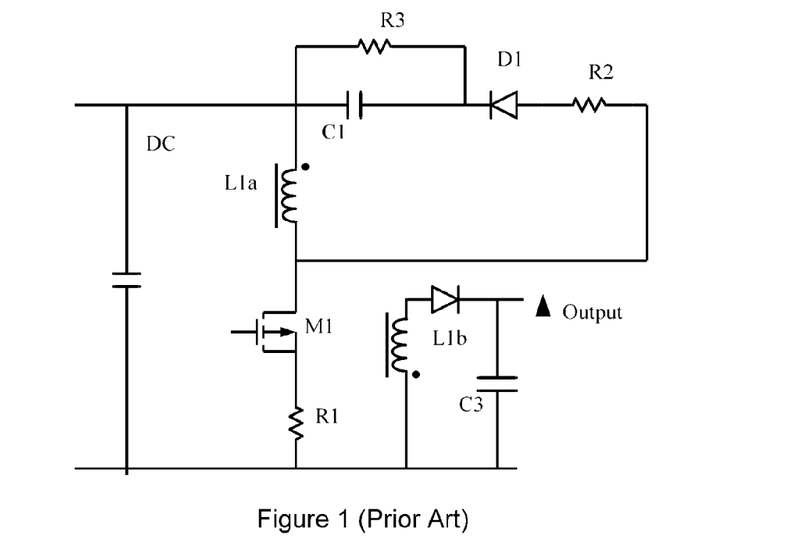
FIG. 1 shows a flyback converter with a known RCD dissipative snubber.

FIG. 1 shows a typical configuration of a flyback converter with a dissipative RCD snubber, which comprises components R2, R3, D1 and C1. The snubber is designed to absorb and dissipate energy stored in the leakage inductance of the coupled inductor (flyback transformer) L1. In a typical design, a snubber of this type will dissipate in the region of 2-4% of the throughput power of the converter, and thus reduces the efficiency of the converter by the same amount.

The primary purpose of the snubber is to limit the voltage across switch M1 so that this voltage stays within safe operating limits, and thereby prevents the energy stored in the leakage inductance of the coupled inductor causing the switch to avalanche.

Figure 2:
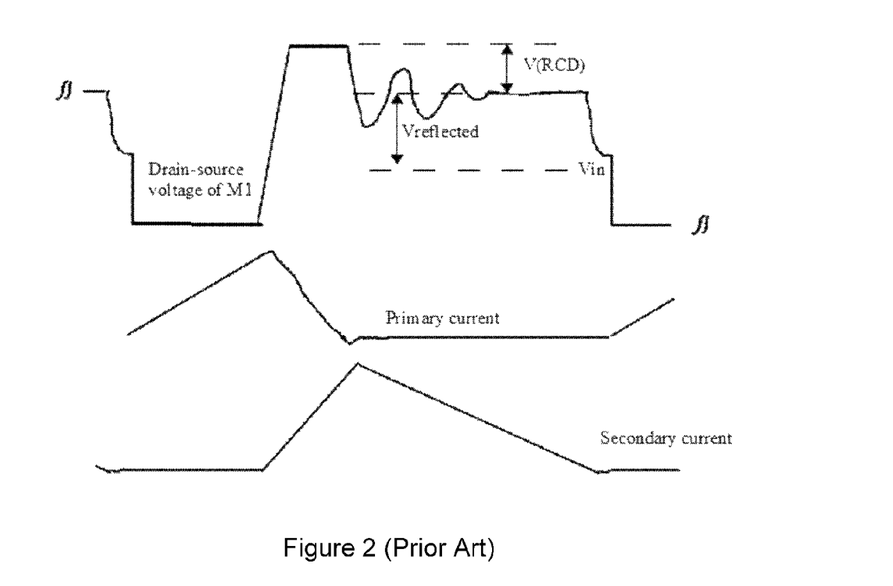
FIG. 2 shows approximate waveforms for operation in BCM of the circuit shown in FIG. 1.

FIG. 2 shows approximate operating waveforms in boundary conduction mode (BCM) for the circuit in FIG. 1. The drain-source voltage of switch M1 is clamped at a value approximately equal to the voltage on the clamp capacitor C1, while current decays in the primary winding L1a and rises in secondary winding(s) L1b. Once current has fallen to zero in the primary winding, the drain-source voltage of switch M1 will exhibit a damped oscillation back to the reflected secondary voltage, Vreflected, and current will decay at a rate proportional to the output voltage. Once current in the secondary winding(s) falls to zero, the drain-source voltage on switch M1 falls, initiating the next cycle.

Figure 3:
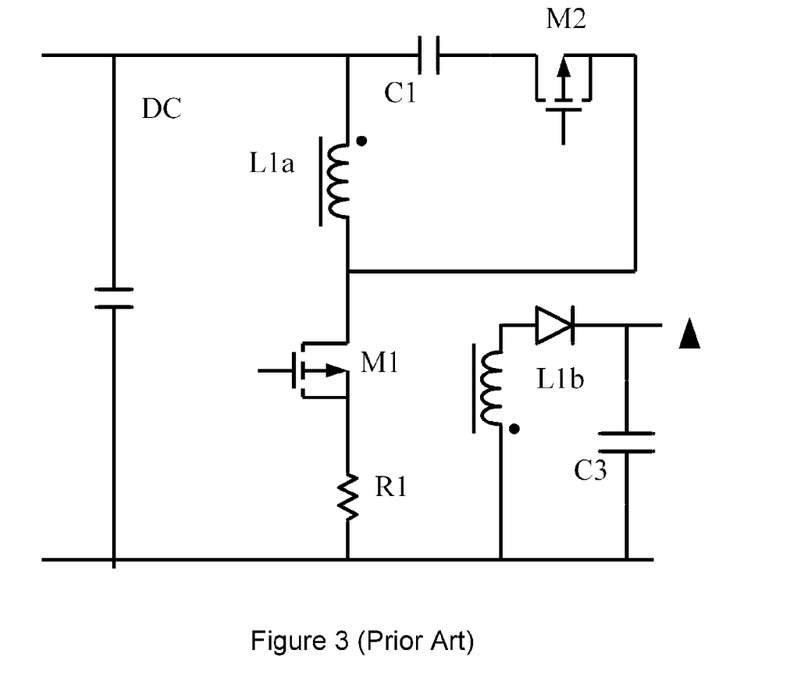
FIG. 3 shows a known active clamp flyback topology.

FIG. 3 shows an active clamp flyback converter, which provides a known alternative to the use of RCD and other dissipative snubbers. In the active clamp flyback topology, switch M2 is controlled to conduct (ie, to be ON) when M1 is not conducting (ie, OFF) and to be OFF when switch M1 is ON. Deadtime, when both switches are OFF is typically added to allow for reducing switching losses.

In the active clamp flyback, capacitor C1 is charged to a voltage that is approximately equal to the reflected secondary voltage, Vreflected. When switch M1 is turned OFF at the end of its ON-time, a resonance takes place between the leakage inductance of the coupled inductor L1 and capacitor C1. Capacitor C1 initially charges and then starts to discharge. In the steady-state, the ampere-seconds applied to C1 over a complete switching cycle must be zero, and the resonant period is preferably longer than the converter OFF-time (ie, the OFF-time of switch M1).

Figure 4:
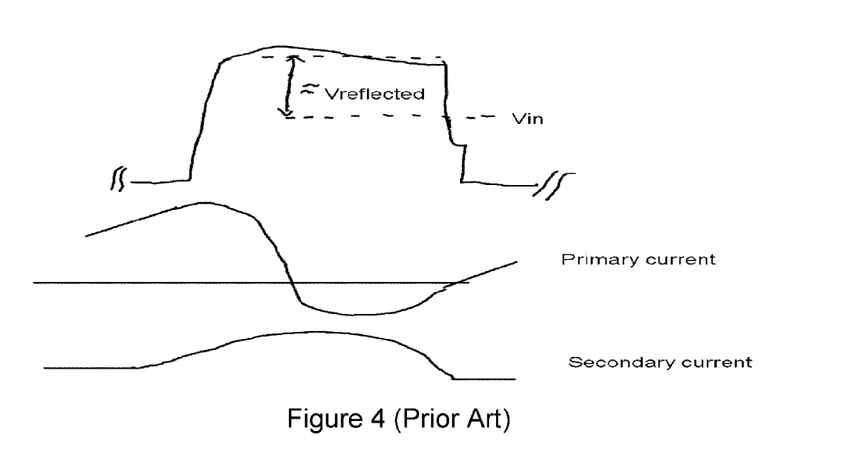
FIG. 4 shows ideal waveforms for the circuit shown in FIG. 3.

FIG. 4 shows approximate operating waveforms for the circuit in FIG. 3. However, it will be appreciated that the exact waveforms will depend on the damping in the system and the amount of leakage energy being handled by the active clamp.

Ideally, the primary current will exhibit one resonant cycle during the OFF-time of the converter, as shown in FIG. 4. However, in practice, this is difficult to achieve, especially when using a controller designed to operate in boundary conduction mode (BCM). Typically, the primary current exhibits multiple resonant cycles during the OFF-time of the converter, leading to jitter on the zero-current point in the secondary circuit. The resonant current in the primary winding leads to extra losses in the primary winding of the transformer, and the impact of jitter will vary depending on the OFF-time.

Although these issues might be resolved by not operating in BCM, BCM is a preferred mode of operation for low-power converters, since it results in relatively low switching losses over the entire load range when used with burst mode, valley counting, and other techniques employed in the latest controllers. Moreover, synchronous rectification of BCM flyback converters is also relatively easy to implement with a low parts count.

It is an object of the present invention to overcome the drawbacks of the prior art.

SUMMARY OF THE INVENTION

According to one embodiment of the present invention, there is provided an energy recovery snubber circuit for a power converter which comprises a flyback transformer driven by a converter switch M1, the snubber circuit comprising two capacitors C1, C2 which are connected such that, when the snubber circuit is connected to a primary winding L1a of the flyback transformer, the capacitors are:

charged in series by current flowing in a first direction in the primary winding when switch M1 is turned OFF, to recover energy stored in the leakage inductance of the transformer; and discharged in parallel to cause current flow in a second direction in the primary winding of the transformer, to thereby transfer the recovered energy to the transformer.

Thus, energy stored in the leakage inductance of the transformer is, at least in part, recovered by the capacitors and then delivered to the output via the transformer. In this respect, when the capacitors discharge, this causes a current to flow in the primary winding which induces an additional current in the secondary winding whereby the recovered energy is delivered to the output.

With this configuration, once the snubber circuit delivers the energy stored in the leakage inductance of the transformer to the output, it is then inactive until the next switching cycle of the converter. This reduces losses in the primary winding of the inductor and overcomes the problem of jitter seen with the known active clamp topology. Further, unlike the active-clamp snubber discussed above, small signal variations in duty-cycle will not give rise to variations in clamp voltage as the circuit tries to re-establish an amps-seconds balance. Moreover, transformer design becomes simple from the point of view of leakage inductance, such that sophisticated winding techniques are not required in order to have tight control over this parameter.

Typical operating waveforms of a flyback converter utilising the snubber circuit of the present invention are very similar to those achieved with an RCD snubber, except that a single half-cycle resonance takes place to deliver the recovered energy to the load.

Preferably, the snubber circuit comprises a snubber switch M2, connected between the primary winding of the transformer and the capacitors C1, C2, such that the capacitors are discharged in parallel when switch M2 is ON.

According to another embodiment of the present invention, there is provided a power converter which comprises:

a flyback transformer driven by a converter switch M1; and an energy recovery snubber circuit, the snubber circuit comprising:

two capacitors C1, C2 connected in series to a primary winding L1a of the transformer via a first rectifier D1, and connectable in parallel to the primary winding L1a via second and third rectifiers D2, D3 and a snubber switch M2, such that, when the converter switch M1 is turned OFF, current flowing in a first direction in the primary winding L1a of the transformer flows through the snubber circuit via rectifier D1, to charge the capacitors C1, C2 in series, and thereby recover energy stored in the leakage inductance of the transformer, and such that, when the snubber switch M2 is ON, the charged capacitors discharge in parallel via rectifiers D2, D3 and snubber switch M2, to cause current flow in a second direction in the primary winding of the transformer, and thereby transfer the recovered energy to the transformer.

Preferably, capacitors C1, C2 are connected in series to the primary winding of the transformer via a fourth rectifier. Thus, the fourth rectifier allows current flow in the first direction.

Preferably, the fourth rectifier is a parasitic diode of the snubber switch M2. For example, as exists in the case of a MOSFET switch. Alternatively, the fourth rectifier may be a separate diode connected in parallel (anti-parallel) with switch M2. Any other suitable configuration, which allows current flow in the first direction, but blocks current flow in the second direction while the snubber switch M2 is OFF, may also be employed.

Preferably, the primary winding L1a has two winding sections L1a1 and L1a2, and wherein the third rectifier D3 connects capacitor C2 to a node or tapping point f located between said winding sections.

With this configuration, capacitor C1 charges to a voltage approximately equal to the reflected secondary voltage, Vreflected, while capacitor C2 charges to a voltage in the range 0-Vreflected, the actual value depending on the turns ratio between the winding sections. More specifically, C2 charges to a voltage given by $$V(C2)=Vreflected*N(L1a2)/(N(L1a1)+N(L1a2)) \quad (1)$$

where N(L1a1) is the number of turns for inductance L1a1 and N(L2a2) is the number of turns for inductance L1a2.

The snubber circuit preferably comprises a controller for controlling the snubber switch M2 to switch periodically between an on-state (ON) and an off-state (OFF). Thus, in each switching cycle, switch M2 has an on-time when it is in the on-state and an off-time when it is in the off-state.

It will be appreciated that the main switch of the converter M1 also switches periodically between an on-state and an off-state under the control of a main converter controller. Thus, in each switching cycle, switch M1 has an on-time when it is in the on-state and an off-time when it is in the off-state.

Preferably, the controller controls switch M2 to switch ON whilst switch M1 is in said off-state. Thus, switch M2 switches ON with zero-voltage switching. Preferably, the controller controls switch M2 to switch off whilst switch M1 is in said off-state, ie, before the main converter controller initiates the next on-time for the main switch M1.

In particular, in each switching cycle of the main switch M1, switch M2 is preferably controlled to switch ON and then OFF during the off-time of switch M1. Preferably, switch M2 remains OFF for the duration of the on-time of switch M1.

Preferably, the controller controls switch M2 to have a fixed on-time in each switching cycle.

Alternatively, the controller implements a minimum on-time control scheme. In particular, switch M2 is preferably switched ON with an on-time which is greater than the half-period of the resonance between the leakage inductance and capacitors C1 and C2.

In either case, the resonant current that flows in the primary winding will fall to zero with the sum of the voltages on capacitors C1 and C2 being greater than Vreflected, and a positive half cycle cannot occur since rectifier D1 will not become forward biased until the next off-transition of switch M1. That is to say, the sum of the voltages on capacitors C1 and C2 is greater than Vreflected at all times.

The values of C1 and C2 are preferably selected such that, when switch M1 is switched OFF, each capacitor is charged to less than 1.5*Vreflected, where Vreflected is the reflected secondary voltage; and such that, after the capacitors have discharged, the sum of the voltages on the two capacitors is greater than Vreflected.

The controller for switch M2 is preferably a synchronous rectifier controller. In particular, it may comprise a FAN6224 synchronous rectifier controller. If the FAN6224 is used, at light load the snubber switch M2 is not gated and a transorb or other dissipative snubber becomes active.

The features and advantages described above in relation to either embodiment of the invention apply equally to all embodiments of the invention.

BRIEF DESCRIPTION OF THE DRAWINGS

The present invention will now be described with reference to the accompanying drawings in which:—

DETAILED DESCRIPTION OF THE INVENTION

Figure 5:
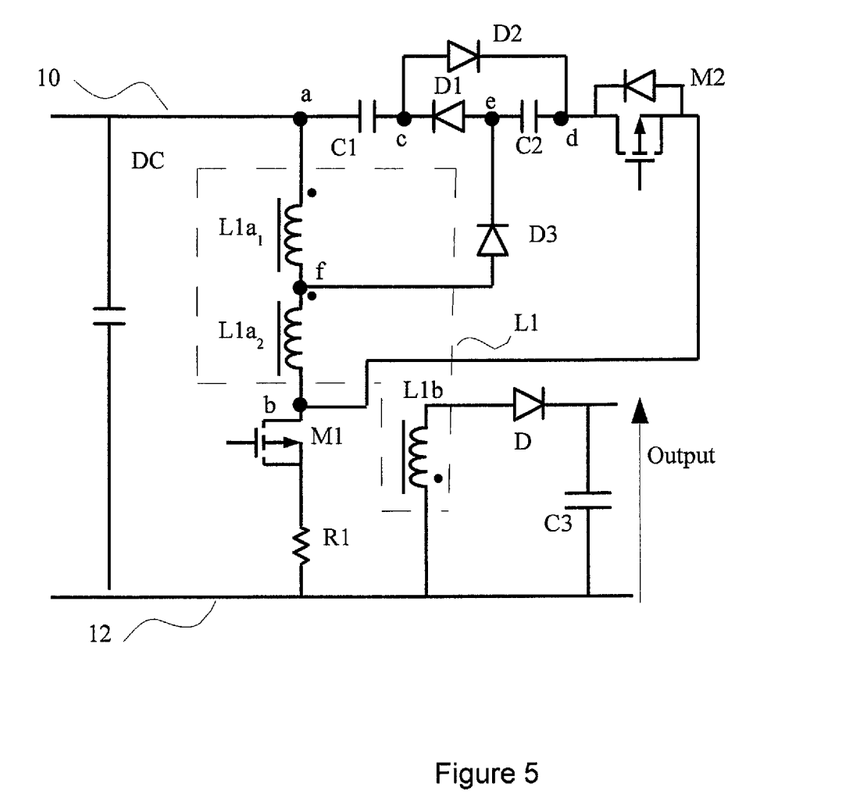
FIG. 5 shows a flyback converter with an energy recovery snubber which embodies the present invention.

The converter illustrated in FIG. 5 comprises a high voltage rail 10 and a low voltage rail 12 which are supplied by a voltage supply (not shown). One side of a bulk capacitor C is connected to the high voltage rail 10 and its other side is connected to the low voltage rail 12.

A transformer (coupled inductor) L1 has a primary winding L1a which comprises two windings L1a1 and L1a2 which are connected together in series at a node f. In this respect, among other suitable configurations, windings L1a1 and L1a2 may respectively comprise sections of a single primary winding component separated by a transformer tap at node f, or they may be two separate winding components connected to one another at node f. Windings L1a1 and L1a2 are inductively coupled to a secondary winding L1b. One end of the primary winding is connected to the high voltage rail 10 at a node a in the circuit. The other end of the primary winding is connected to a node b in the circuit. Node f is located at the interconnection of windings L1a1 and L1a2. Preferably, the turns ratio of these windings, L1a1: L1a2, is in the range 0-1.

The drain terminal of a switch M1 is connected to node b, and the source terminal of switch M1 is connected to one end of a resistor R1, the other end of which is connected to the low voltage rail 12. The gate terminal of switch M1 is connected to a controller, not shown. Switch M1 is typically a MOSFET (Metal Oxide Semiconductor Field Effect Transistor). Resistor R1 is used by a controller (not shown) for sensing primary current when M1 is on. R1 may be omitted if alternative current sensing means is used.

One end of secondary winding L1b is connected to the anode of a diode D. The cathode of diode D2 is connected to one side of an output capacitor C3. The other side of capacitor C3 is connected to the other end of secondary winding L1b. Secondary winding L1b is oriented relative to the primary winding L1a and diode D2 such that the voltage induced by current flow in L1a when switch M1 is conducting reverse biases diode D, and such that the voltage induced when switch M1 is not conducting forward biases diode D. It will be appreciated by someone skilled in the art that the output rectifier diode D could be replaced by any device capable of being used as a rectifier.

Output capacitor C3 supplies an output voltage Vout to a load (not shown).

In use, the bulk storage capacitor C draws and stores energy from the voltage supply. When switch M1 is ON, the primary winding of the transformer is connected to capacitor C which supplies an input voltage to the transformer. In this state, the primary current and magnetic flux in the transformer increases, inducing a negative voltage in the secondary winding, such that diode D is reverse biassed. In this state, current cannot flow in the secondary winding and energy is stored in the transformer. When switch M1 is subsequently switched OFF, the primary current and magnetic flux in the transformer drops, inducing a positive voltage in the secondary winding, such that diode D is forward biased. In this state current can flow in the secondary winding, and energy stored in the transformer is transferred to the output capacitor C3 to be transferred to the load.

To this extent, the power converter is configured to operate as a flyback converter, and the transformer may be termed a flyback transformer.

Energy recovery snubber 14 comprises capacitors C1 and C2, diodes D1, D2 and D3, and a second MOSFET switch M2. One side of capacitor C1 is connected to node a. The other side of capacitor C1 is connected to the cathode of diode D1. The anode of diode D1 is connected to one side of capacitor C2. The other side of capacitor C2 is connected to the drain terminal of switch M2. The source terminal of switch M2 is connected to node b. The anode of diode D2 is connected to a node c located between capacitor C1 and diode D1. The cathode of diode D2 is connected to a node d located between capacitor C2 and switch M2. The anode of diode D3 is connected to node f located between windings L1a1 and L1a2 and the cathode of diode D3 is connected to a node e located between diode D1 and capacitor C2. As shown in FIG. 5, switch M2 has a parasitic anti-parallel diode. Thus, capacitors C1 and C2 are connected by switch M2 and diodes D1, D2, D3 to be charged in series and to be discharged in parallel. In particular, capacitors C1 and C2 are charged through the path L1a1, L1a2, M2 (ie its parasitic diode), C2, D1, C1, while capacitor C1 discharges through the path D2, M2, L1a1 and L1a2, and capacitor C2 discharges through the path M2, L1a2 and D3. The gate terminal of switch M2 is connected to a controller (not shown). This describes the circuit in the case where M2 is an N-channel MOSFET. However, it will be appreciated that M2 may alternatively be a P-channel MOSFET, or another switch type.

When switch M1 is turned OFF, capacitors C1 and C2 are charged due to the energy stored in the leakage inductance of the coupled inductor L1.

Capacitors C1, C2 are assumed to have a sufficiently high value that, in normal operation, each is charged to less than 1.5 times the reflected secondary voltage Vreflected when M1 is turned OFF. Capacitors C1, C2 are also assumed to have a sufficiently high value that the sum of the voltages on the two capacitors is greater than Vreflected at all times, in normal operation.

M2 is gated ON, preferably with a fixed ON-time, or with an ON-time that is greater than the half-period of the resonance between the leakage inductance and the capacitors C1 and C2.

Accordingly, the resonant current that flows will fall to zero with the sum of the voltages on capacitors C1 and C2 charged to greater than Vreflected. Thus, the sum of the voltages on capacitors C1, C2 is greater than Vreflected at all times, and a positive resonant half-cycle cannot occur because diode D1 will not become forward biased until the next turn-off transition of switch M1.

C1 will be charged to the reflected voltage Vreflected and C2 will be charged to approximately $$V(C2) = V\text{reflected} * N(L1a2)/(N(L1a1) + N(L1a2)) \quad (1)$$

where N(L1a1) is the number of turns on winding section L1a1 and N(L2a2) is the number of turns on winding section L1a2.

Preferably, switch M2 is turned ON after switch M1 is switched OFF so that it switches ON with Zero-Voltage switching.

Switch M2 can then be switched OFF with zero current. Unlike the active clamp flyback circuit, small signal variations in duty cycle will not give rise to variations in clamp voltage as the circuit tries to re-establish an amps-second balance.

Figure 6:
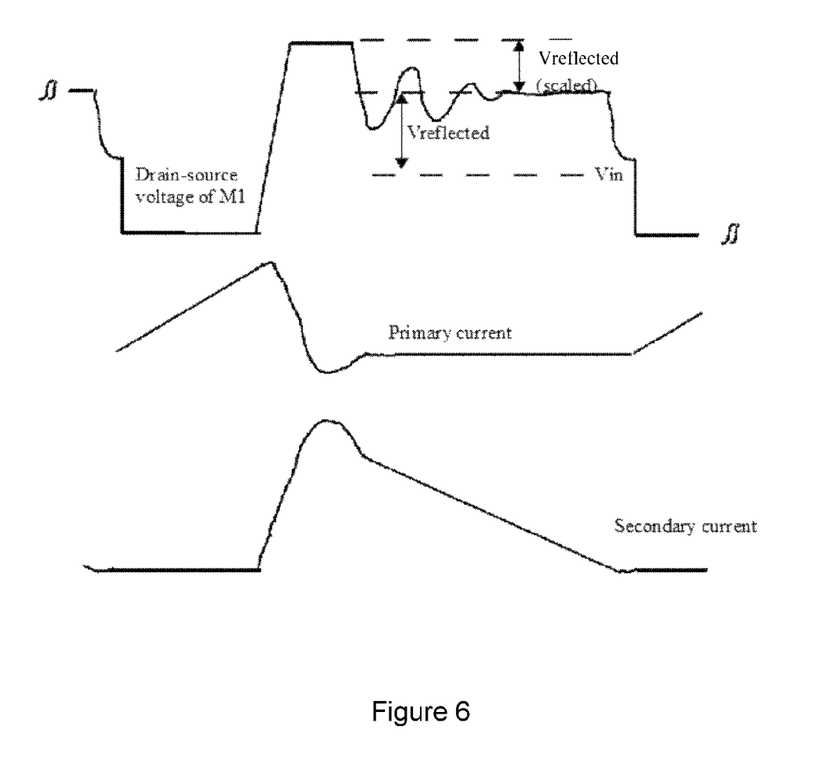
FIG. 6 shows typical waveforms for the converter shown in FIG. 5.

Typical operating waveforms for the circuit of FIG. 5 are shown in FIG. 6. These waveforms are very similar to the operating waveforms achieved with an RCD snubber, except that a single half-cycle resonance takes place to deliver the energy recovered by the snubber back to the load.

It is also possible to gate switch M2 ON towards the end of the OFF-time of switch M1 to reduce output filter ripple current and provide zero-voltage turn-ON for switch M1.

The controller preferably implements a fixed ON-time control for M2.

Alternatively, a volt-second balancing technique is used such as that implemented in the FAN6224 synchronous rectifier controller. In this case, at light load, the energy recovery snubber may be disabled and a transorb or other dissipative snubber activated.

It is also possible to use other synchronous rectifier controllers that implement a minimum ON-time control scheme, or any other controller that allows switch M2 to conduct when switch M1 is not conducting, ensuring that switch M2 turns OFF before switch M1 initiates the next ON-time.

An advantage of the energy recovery snubber of the present invention is that transformer design becomes simple from the point of view of leakage inductance. Thus, it is not necessary to use sophisticated winding techniques to have control over this parameter.

With the energy recovery snubber of the present invention, the peak drain-source voltage of switch M1 Vdspk is given by $$Vdspk=Vin+(1+N(L1a2))/(N(L1a1)+N(L1a2))\times Vreflected \quad (2)$$

where Vin is the input voltage, N(L1a1) is the number of turns for inductance L1a1, N(L1a2) is the number of turns for inductance L1a2, and Vreflected is the reflected secondary voltage. In contrast, with the active clamp circuit of FIG. 3, $$Vdspk=Vin+Vreflected \quad (3)$$

Thus, Vdspk is higher with the present invention than with the active clamp topology. Nevertheless, the advantages of the present invention outweigh this one disadvantage. In particular, the circuit operates with approximately the same waveforms as a conventional BCM flyback converter, and can utilise the low cost and low parts-count controllers optimised for this zero-switching topology.

Figure 7:
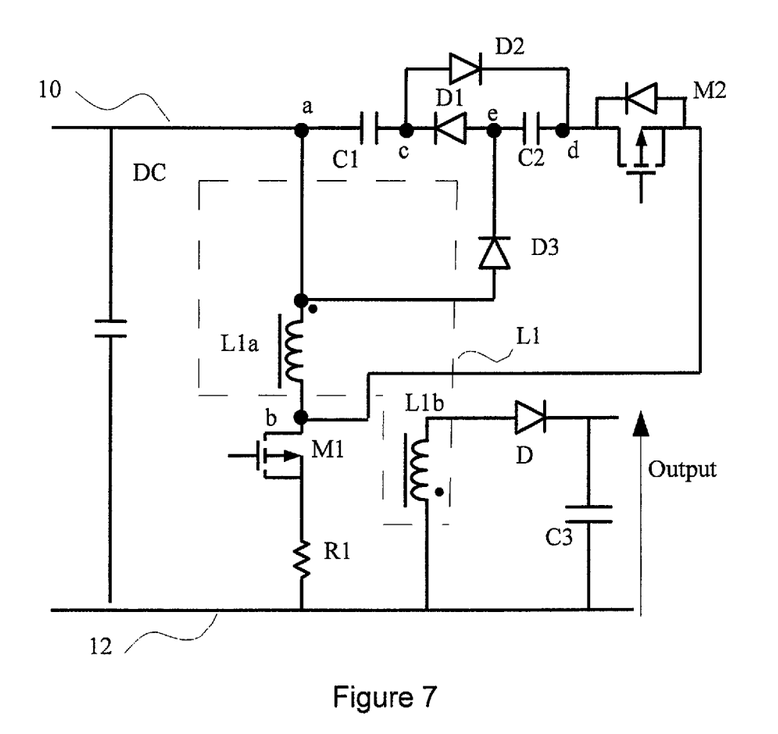
FIG. 7 shows another flyback converter with an energy recovery snubber which embodies the present invention.

FIG. 7 shows a another flyback converter with an energy recovery snubber which embodies the present invention. The circuit is identical to the circuit shown in FIG. 5 except that windings L1a1 and L1a2 are replaced by a single winding L1a; and the anode of diode D3 is connected to node a.

Operation of the converter of FIG. 7 is similar to that of FIG. 5, except that capacitor C1 discharges through the path D2, M2, L1a and capacitor C2 discharges through the path M2, L1a, D3.

The present invention has been described in the context of a flyback power converter topology. However, it will be appreciated that the principles of the invention may be applied to any converter topologies which contain one or more transformers whose primary and secondary windings are connected for operation as a flyback transformer.

The embodiments described above employ a MOSFET switch as snubber switch M2, which incorporates an anti-parallel diode which allows current flow to charge the capacitors C1, C2 in series. However, it will be appreciated that the MOSFET switch could be replaced by a different switching device used in combination with a separate anti-parallel diode.

It will be understood that the embodiments illustrated above show an application of the invention only for the purposes of illustration. In practice the invention may be applied to many different configurations, the detailed embodiments being straightforward for those skilled in the art to implement.

The invention claimed is:

1. An energy recovery snubber circuit for a power converter which comprises a flyback transformer driven by a converter switch,
the snubber circuit comprising first and second capacitors which are connected such that, when the snubber circuit is connected to a primary winding of the flyback transformer, the capacitors are:
charged in series by current flowing in a first direction in the primary winding when the converter switch is in an off-state, to recover energy stored in the leakage inductance of the transformer; and
discharged in parallel to cause current flow in a second direction in the primary winding of the transformer, to thereby transfer the recovered energy to the transformer,
the snubber circuit further comprising at least one snubber switch configured to controllably complete first and second paths by which the first and second capacitors, respectively, discharge via at least part of the primary winding of the transformer.

2. A power converter which comprises:
a flyback transformer driven by a converter switch; and
an energy recovery snubber circuit, the snubber circuit comprising:
first and second capacitors connected in series to a primary winding of the transformer via a first rectifier, and connectable in parallel to the primary winding via second and third rectifiers and a snubber switch,
such that, when the converter switch is in an off-state, current flowing in a first direction in the primary winding of the transformer flows through the snubber circuit via the first rectifier, to charge the first and second capacitors in series, and thereby recover energy stored in the leakage inductance of the transformer,
and such that the snubber switch is configured to controllably complete first and second paths by which the first and second capacitors, respectively, discharge via at least part of the primary winding of the transformer, thereby causing current flow in a second direction in the primary winding of the transformer and transferring the recovered energy to the transformer.

3. The power converter according to claim 2 wherein the first and second capacitors are connected in series to the primary winding of the transformer via a fourth rectifier.

4. The power converter according to claim 3 wherein the fourth rectifier is a parasitic diode of the snubber switch.

5. The power converter according to claim 2 wherein the primary winding has two winding sections, and wherein the third rectifier connects the second capacitor to a node or tapping point located between said winding sections.

6. The power converter according to claim 5 wherein the first capacitor charges to a first voltage V(C1), substantially equal to a reflected secondary voltage Vreflected, and wherein the second capacitor charges to a second voltage V(C2) in the range 0-Vreflected.

7. The power converter according to claim 6 wherein the second capacitor charges to a voltage given by $$V(C2)=Vreflected*N(L1a2)/(N(L1a1)+N(L1a2)) \quad (1).$$

8. The power converter according to claim 2 wherein the first capacitor is connected to a node located at one end of the primary winding, and wherein the third rectifier connects the second capacitor to the node.

9. The power converter according to claim 2 further comprising a controller for controlling the snubber switch to switch periodically between an on-state and an off-state.

10. The power converter according to claim 9 wherein the controller controls the snubber switch to switch to an on-state while the converter switch is in an off-state.

11. The power converter according to claim 9 wherein the controller controls the snubber switch to switch to an off-state while the converter switch is in an off-state.

12. The power converter according to claim 9 wherein the controller controls the snubber switch to switch to an on-state and then to an off-state during the off-time of converter switch.

13. The power converter according to claim 12 wherein the controller controls the snubber switch to remain in an off-state for the duration of the on-time of converter switch.

14. The power converter according to claim 9 wherein the controller controls the snubber switch to have a fixed on-time in each switching cycle.

15. The power converter according to claim 9 wherein the controller controls the snubber switch with a minimum on-time control scheme.

16. The power converter according to claim 9 wherein the controller controls the snubber switch to have an on-time, in each switching cycle, which is longer than the half-period of the resonance between the leakage inductance and the capacitances of the first and second capacitors.

17. The power converter according to claim 9 wherein the controller is a synchronous rectifier controller.

18. The power converter according to claim 9 wherein the controller is a FAN6224 synchronous rectifier controller.

19. The power converter according to claim 2 wherein the values of the capacitances of the first and second capacitors are selected such that, when the converter switch is in an off-state, each capacitor is charged to less than 1.5*Vreflected, where Vreflected is a reflected secondary voltage, and such that, after discharge, the sum of the voltages on the first and second capacitors is greater than Vreflected.

* * * * *